United States Patent
Kojima et al.

(10) Patent No.: US 6,174,626 B1
(45) Date of Patent: Jan. 16, 2001

(54) POLYELECTROLYTE COMPRISING A (METH) ACRYLIC POLYMER AND AN IONIC SALT

(75) Inventors: Makoto Kojima; Tetsuo Omata, both of Osaka (JP)

(73) Assignee: Nitto Denko Corporation, Osaka (JP)

(*) Notice: Under 35 U.S.C. 154(b), the term of this patent shall be extended for 0 days.

(21) Appl. No.: 09/006,935

(22) Filed: Jan. 14, 1998

(30) Foreign Application Priority Data

Jan. 16, 1997 (JP) .................................................. 9-005317

(51) Int. Cl.⁷ ...................................................... H01M 6/18
(52) U.S. Cl. ........................... 429/306; 429/309; 429/3.4; 429/3.7; 429/321; 429/322; 429/324; 252/62.2; 528/272
(58) Field of Search .................................. 429/309, 306, 429/314, 317, 321, 322, 324; 252/62.2; 528/272

(56) References Cited

U.S. PATENT DOCUMENTS 5,463,179 * 10/1995 Chaloner-Gill et al. ............. 429/314

FOREIGN PATENT DOCUMENTS 1-263622 * 10/1989 (JP) .
3-210351 * 9/1991 (JP) .

* cited by examiner

Primary Examiner—Laura Weiner
(74) Attorney, Agent, or Firm—Sughrue, Mion, Zinn, Macpeak & Seas, PLLC

(57) ABSTRACT

An ion-conducting polyelectrolyte moldable and flexible even at low temperatures is disclosed, comprising a (meth) acrylic polymer and an ionic salt, the (meth)acrylic polymer comprising (A) 20 to 100 parts by weight of a (meth)acrylic monomer represented by formula (I):

$$CH_2=C(R_1)COO-R_2-R_3 \qquad (I)$$

wherein $R_1$ represents a hydrogen atom or a methyl group; $R_2$ represents an alkyl group having 3 to 12 carbon atoms; and $R_3$ represents $(XR_4)_nXR_5$, wherein X represents —O— or —S—; $R_4$ represents an alkyl group having 1 to 4 carbon atoms; n represents 0 or an integer of 1 to 20; and $R_5$ represents a hydrogen atom, a methyl group or an ethyl group, (B) 0 to 80 parts by weight of a (meth)acrylic monomer represented by formula (II):

$$CH_2=C(R_1)COO-R_6 \qquad (II)$$

wherein $R_1$ represents a hydrogen atom or a methyl group; and $R_6$ represents an alkyl group having 2 to 12 carbon atoms, and (C) 0 to 30 parts by weight, per 100 parts by weight of the total amount of components (A) and (B), of a monomer copolymerizable with components (A) and (B).

8 Claims, No Drawings

POLYELECTROLYTE COMPRISING A (METH) ACRYLIC POLYMER AND AN IONIC SALT

FIELD OF THE INVENTION

The present invention relates to a polyelectrolyte used in primary batteries, secondary batteries, electrochromic displays, electrochemical sensors, iontophoresis devices, capacitors, and other electrochemical devices. More particularly, the invention relates to a polyelectrolyte comprising a (meth)acrylic polymer as a main component, and also to sheets obtained by forming this in the form of a sheet, a tape, of the like.

BACKGROUND OF THE INVENTION

With the recent increasing demand for reduction in size and weight of electronic equipment, electrochemical devices have been attracting attention. Electrochemical devices are constituted of a variety of constituent materials, and improvement is shown in the respective constituent materials. Of those constituent materials, an electrolytic solution is one of the main materials making up lithium batteries. The electrolytic solution generally comprises an organic solvent, such as propylene carbonate or ethylene carbonate, and an ionic salt, such as lithium fluorophosphate, as a solute, while it depends on matching with positive and negative electrodes. Use of such an electrolytic solution, however, involves many problems in, for example, leakage of liquid, safety, and the like. A polymer having dispersed therein a compound whose ion is easily movable, and a polyelectrolyte layer comprising a crosslinked polymer comprising polyethylene oxide as a main component, have been proposed. However, their performance is insufficient as yet in terms of flexibility at low temperatures or stability. Thus, a satisfactory electrolyte is not yet obtained. It has therefore been demanded to develop an effective polyelectrolyte that overcomes the above problems and will contribute to further advancement of technology.

SUMMARY OF THE INVENTION

The present invention has been made in view of the above problems in the prior art.

Accordingly, an object of the present invention is to provide an ion-conducting polyelectrolyte which is easily molded and has flexibility even at low temperatures.

As a result of extensive investigations, it has been found that a polyelectrolyte which is moldable and is also stable in the working temperature range can be obtained by using a (meth)acrylic polymer comprising a monomer having a specific structure as an ion-conducting functional component. The present invention has been completed based on this finding.

According to one embodiment of the present invention, there is provided a polyelectrolyte comprising a (meth) acrylic polymer and an ionic salt, the (meth)acrylic polymer comprising:

(A) 20 to 100 parts by weight of a (meth)acrylic monomer represented by the following formula (I):

$$CH_2=C(R_1)COO-R_2-R_3 \quad (I)$$

wherein $R_1$ represents a hydrogen atom or a methyl group; $R_2$ represents an alkyl chain having 3 to 12 carbon atoms; and $R_3$ represents $(XR_4)_nXR_5$, wherein X represents —O— or —S—; $R_4$ represents an alkyl group having 1 to 4 carbon atoms; n represents 0 or an integer of 1 to 20; and $R_5$ represents a hydrogen atom, a methyl group or an ethyl group, (B) 0 to 80 parts by weight of a (meth)acrylic monomer represented by the following formula (II):

$$CH_2=C(R_1)COO-R_6 \quad (II)$$

wherein $R_1$ represents a hydrogen atom or a methyl group; and $R_6$ represents an alkyl group having 2 to 12 carbon atoms, and (C) 0 to 30 parts by weight, per 100 parts by weight of the total amount of components (A) and (B), of a monomer copolymerizable with components (A) and (B).

According to another embodiment of the present invention, there is provided a polyelectrolyte comprising 100 parts by weight of the (meth)acrylic polymer comprising components (A), (B), and (C) and 400 parts by weight or less of an ionic salt solution.

According to further embodiment of the present invention, there is provided sheets, such as a film, a sheet, or a tape, comprising a substrate having provided on one or both sides thereof a layer formed of the above polyelectrolyte that is solid at room temperature.

DETAILED DESCRIPTION OF THE INVENTION

The (meth)acrylic monomer as component (A) has a structure having a relatively long alkyl chain ($R_2$) as a side chain, as represented by the formula (I). $R_2$ in formula (I) includes tetramethylene ($C_4$), hexamethylene ($C_6$), and octamethylene ($C_8$) groups. If the number of carbon atoms in $R_2$ is smaller than 3, in the (meth)acrylic polymer comprising an ester of acrylic acid or methacrylic acid having such a relatively long side chain (alkyl chain), a (thio)glycol moiety on the side chain which serves as a functional component with ion conductivity will greatly affect the main chain in the resulting (meth)acrylic polymer, for example, only to provide a (meth)acrylic polymer having an increased glass transition temperature and thereby lacking flexibility. On the other hand, if the number of carbon atoms in $R_2$ is greater than 12, the mutual influences among the side chains become conspicuous, resulting in an increase in glass transition temperature, too. Monomers containing a methyl group, an ethyl group, etc. as a branch of the alkyl side chain can also be used.

$R_3$ that is bonded to the end of the side chain is an ion-conducting functional component. $R_3$ includes a hydroxyl group, a methoxy group or an ethoxy group and their sulfur analogues; glycols (e.g., polymethylene glycol, polyethylene glycol, and polypropylene glycol) and/or sulfur analogues thereof (thioglycols); and these (thio)glycols with the end thereof methylated or ethylated.

If the number of carbon atoms in the (thio)glycol moiety represented by $R_4$ is greater than 4, the density of the functional component serving for ion conduction is too small for sufficient manifestation of ion conductivity. The number n of the repeating units is 20 or less. If it exceeds 20, this moiety exerts too much cohesive force, making it difficult to secure flexibility of the (meth)acrylic polymer.

Since the (meth)acrylic polymer has a relatively long alkyl chain, the (meth)acrylic polymer containing such component (A) has degree of freedom between the polymer main chain and the ion-conducting functional component. As a result, an increase in glass transition temperature is relaxed to secure flexibility, and the effect of the ion-conducting functional component on the polymer side chain can be enhanced markedly.

The (meth)acrylic monomer as component (A) is not limited by the process for preparation. For example, it is prepared by starting with a diol selected so as to give a desired side chain length. The diol is brominated with hydrogen bromide to obtain a dibromide having a desired side chain length. The dibromide is reacted with Cellosolve, Carbitol or a sulfur analogue thereof, etc. in the form of, e.g., a sodium salt to obtain a bromide having an ion-conducting functional group, which is then reacted with (meth)acrylic acid.

The (meth)acrylic monomer represented by the formula (II) as component (B) is a monomer effective in imparting flexibility to the resulting (meth)acrylic polymer. That is, the alkyl chain $R_6$ having 2 to 12 carbon atoms makes a contribution to the flexibility of the polymer similarly to $R_2$ of component (A).

Accordingly, it is preferred for $R_6$ in component (B) to have approximately the same number of carbon atoms as in $R_2$ of component (A). Examples of component (B) are ethyl (meth)acrylate, propyl (meth)acrylate, butyl (meth)acrylate, hexyl (meth)acrylate, octyl (meth)acrylate, decyl (meth) acrylate, and dodecyl (meth)acrylate. In other words, component (B) cooperate with component (A) in securing flexibility of the (meth)acrylate polymer. Component (B) is particularly effective where the ion-conducting functional moiety on the side chain of component (A) is relatively large or where an ionic salt solution containing a relatively large amount of an organic solvent is used.

One or more than one (meth)acrylic monomers (I) can be used as component (A). Component (A) is used in a proportion of 20 to 100 parts by weight, and preferably 50 to 95 parts by weight, per 100 parts by weight of the total of components (A) and (B). In a proportion less than 20 parts, sufficient ion conductivity is hardly exhibited.

One or more than one (meth)acrylic monomers (II) can be used as component (B). Component (B), which is used if necessary to impart flexibility, is used in a proportion of up to 80 parts by weight, and preferably 5 to 50 parts by weight, per 100 parts by weight of the total of components (A) and (B). If component (B) is used in a proportion exceeding 80 parts, it is natural that sufficient ion conductivity is hardly exhibited.

Component (C) selected from monomers copolymerizable with components (A) and (B) is often used for the purpose of balancing various characteristics of the (meth) acrylic polymer or for the purpose of crosslinking the polymer. Specific examples of useful monomers include carboxyl-containing monomers, such as acrylic acid, methacrylic acid, carboxyethyl acrylate, itaconic acid, maleic acid, and crotonic acid; sulfo-containing monomers, such as 2-acrylamide-2-methylpropane-sulfonic acid; phospho-containing monomers, such as 2-hydroxyethylacryloyl phosphate and 2-hydroxypropylacryloyl phosphate; amide monomers, such as acrylamide, an N-substituted acrylamide, N-vinylpyrrolidone, and an N-vinylcarboxylic acid amide; vinyl monomers, such as vinyl acetate and styrene; and (meth)acrylate monomers other than components (A) and (B), such as glycidyl (meth)acrylate, 2-hydroxyethyl (meth)acrylate, 2-hydroxypropyl (meth) acrylate, methyl (meth)acrylate, tetrahydrofurfuryl (meth) acrylate, fluorine-containing (meth)acrylates, and silicon-containing (meth)acrylates.

If some cases, a monomer copolymerizable with components (A) and (B) and capable of introducing an unsaturated bond into the copolymer, such as a polyfunctional (meth) acrylate, can be used as component (C). For example, such a monomer can provide crosslinking sites where the resulting polymer is to be subjected to post-crosslinking in the absence of a crosslinking agent, for example, electron radiation-induced crosslinking. Monomers that can be incorporated for use as a crosslinking agent include hexanediol (meth)acrylate, (poly)ethylene glycol di(meth)acrylate, (poly)propylene glycol di(meth)acrylate, neopentyl glycol di(meth)acrylate, pentaerythritol di(meth)acrylate, trimethylolpropane tri(meth)acrylate, pentaerythritol tri(meth) acrylate, dipentaerythritol hexa(meth)acrylate, epoxy acrylate, polyester acrylate, urethane acrylate, and so on.

One or more than one monomers can be used as component (C). The proportion of component (C), if used, is 30 parts by weight, and preferably 25 parts by weight or less, per 100 parts by weight of the total amount of components (A) and (B). If the proportion of component (C) exceeds 30 parts by weight, the proportion of components (A) and (B) is necessarily reduced, and the resulting polymer fails to exhibit sufficient flexibility or ion conductivity.

From the standpoint of satisfactory ion conductivity at low temperatures, the (meth)acrylic polymer comprising component (A) and, if desired, components (B) and/or (C), preferably has a glass transition temperature of 0° C. or below, particularly –10° C. or below.

The (meth)acrylic polymer which can be used in the present invention is obtained by homopolymerizing component (A). or copolymerizing a monomer mixture comprising component (A) and components (B) and/or (C) by solution polymerization, emulsion polymerization, bulk polymerization, suspension polymerization or any other well-known polymerization methods in a conventional manner. As for bulk polymerization, a method using ultraviolet irradiation is preferably used.

Commonly used polymerization initiators can be used in the polymerization. Examples of suitable thermal polymerization initiators are benzoyl peroxide, azobisisobutyronitrile, t-butyl perbenzoate, cumene hydroperoxide, diisopropyl peroxydicarbonate, di-n-propyl peroxydicarbonate, di(2-ethoxyethyl) peroxydicarbonate, t-butyl peroxyneodecanoate, t-butyl peroxypivalate, di(3,5, 5-trimethylhexanoyl) peroxide, dilauroyl peroxide, dipropionyl peroxide, diacetyl peroxide, and ammonium or potassium persulfate. Examples of suitable photopolymerization initiators include acetophenone initiators, such as 4-(2-hydroxyethoxy)phenyl 2-hydroxy-2-propyl ketone, α-hydroxy-α,α'-dimethylacetophenone, methoxyacetophenone, and 2,2-dimethoxy-2-phenylacetophenone; benzoin ether initiators, such as benzoin ethyl ether and benzoin isopropyl ether; ketal initiators, such as benzyl dimethyl ketal; and others, such as halogenated ketones, acyl phosphinoxides, and acyl phosphonates.

The ionic salts which can be used in the present invention include $LiClO_4$, $LiBF_4$, $LiAsF_6$, $LiCF_3SO_3$, $LiPF_6$, $LiI$, $LiBr$, $LiSCN$, $NaI$, $Li_2B_{10}Cl_{10}$, $LiCF_3CO_2$, $NaBr$, $NaSCN$, $KSCN$, $Mg(ClO_4)_2$, $(CH_3)_4NBF_4$, $(CH_3)_4NBr$, $(C_2H_5)_4NClO_4$, $(C_2H_5)_4NHI$, $(C_3H_7)_4NBr$, $(n-C_4H_9)_4NClO_4$, $(n-C_4H_9)_4HI$, and $(n-C_5H_{11})_4NI$. While not limiting, lithium ion salts capable of providing a high energy density are preferred from the viewpoint of size and weight reduction of electrochemical devices. The ionic salt may be added to the polymerization system or be mixed with the resulting polymer.

The ionic salt can be used in combination with a compound capable of dissolving the ionic salt.

The compound capable of dissolving the ionic salt to provide an ionic salt solution includes organic solvents, such as tetrahydrofuran, 2-methyltetrahydrofuran, 1,3-dioxolane, 4,4-dimethyl-1,3-dioxolane, γ-butyrolactone, γ-valerolactone, ethylene carbonate, propylene carbonate, butylene carbonate, sulfolane, 3-methyl sulfone, t-butyl ether, isobutyl ether, 1,2-dimethoxyethane, 1,2-ethoxymethoxyethane, methyl diglyme, methyl triglyme, methyl tetraglyme, ethyl glyme, and ethyl diglyme.

The ionic salt solution can be used in an amount of 400 parts by weight or less per 100 parts by weight of the (meth)acrylic polymer. Application of the ionic salt solution produces satisfactory results in some cases, but use of too much ionic salt solution should be avoided in favor of the characteristics required as a polyelectrolyte. From this viewpoint, it is effective to use in combination a compound serving for ion conduction, such as an ether compound, a polyether compound, a thioether compound, or a polythioether compound, and some additives serving to improve matching with an electrode, either individually or as a mixture thereof.

The (meth)acrylic polymer of the present invention may have a crosslinked structure that can be obtained by adding the above polyfunctional (meth)acrylate to the polymerization system as an internal crosslinking agent or by subjecting the polymer produced to crosslinking in the presence of an external crosslinking agent, such as a polyfunctional isocyanate compound, an epoxy compound, an aziridine compound, a melamine resin, a metal chelating compound, and the like. The polymer produced may be subjected to crosslinking by active rays such as electron rays.

The sheets according to the present invention is a sheet, a tape or the like which is obtained by forming a layer comprising the above-described (meth)acrylic polymer and ionic salt as main components and, if desired, a compound capable of dissolving the ionic salt, on one or both sides of a substrate. The substrate to be used includes metallic foil, woven fabric, nonwoven fabric, a porous film, a plastic film, paper, and a foamed body. The side of the substrate on which the layer is to be provided may previously be subjected to a surface treatment for release or adhesion.

As described above, the (meth)acrylic polymer used in the present invention has such a structural characteristic that there is a relatively long alkyl side chain between the main chain and an ion-conducting functional component bonded to the side chain. Because this alkyl chain offers degree of freedom to some extent between the polymer main chain and the ion-conducting functional moiety, an increase in glass transition temperature of the polymer can be controlled to thereby provide a polyelectrolyte which exhibits flexibility even at low temperatures and outstandingly displays the full effect of the ion-conducting functional component on the side chain.

The present invention will now be described in more detail by reference to the following Examples, but it should be understood that the invention is not construed as being limited thereto. Unless otherwise indicated, all parts are by weight.

EXAMPLE 1

1,6-Dibromohexane and a sodium alcoholate of methyl cellosolve were reacted to obtain a bromide having a methoxyethyl ether moiety at the end of its chain. The bromide and acrylic acid were reacted to prepare an acrylic monomer having a hexamethylene of chain length 6 in its side chain.

In 150 parts of ethyl acetate was dissolved 100 parts of the resulting acrylic monomer, and 0.5 part of azobisisobutyronitrile was added to the solution as a polymerization initiator. The solution was put in a reaction vessel equipped with a condenser, an inlet for nitrogen, a thermometer, and a stirrer, and polymerized at 60 20 C. for 4 hours and then at 80° C. for 2 hours to obtain an acrylic polymer solution of polymer conversion of 99%.

To the polymer solution was added 10 parts of lithium perchlorate, and the solution was cast on a glass plate and dried at 80° C. for 5 minutes to obtain a soft film having a thickness of 100 μm. The ion conductivity of the film was $8 \times 10^{-4}$ S/cm at 25° C. as measured in a complex impedance method (hereinafter the same). Even at low temperature as −20° C. the film was flexible and had an ion conductivity of $3.5 \times 10^{-4}$ S/m.

EXAMPLE 2

In the same reaction vessel as used in Example 1, 99.5 parts of an acrylic monomer having a hexamethylene chain of chain length 6 in its side chain and a methoxyethyl ether moiety at the end of the side chain and 0.5 part of 6-hydroxyhexyl acrylate (serving to provide reactive sites to an isocyanate compound added as a crosslinking agent as hereinafter described) were dissolved in 150 parts of ethyl acetate, and 0.5 part of azobisisobutyronitrile was added as a polymerization initiator. The solution was polymerized at 60° C. for 4 hours and then at 80° C. for 2 hours to obtain an acrylic polymer solution of polymer conversion of 99%.

To the polymer solution was added 10 parts of lithium perchlorate, and 2 parts of Colonate L (trimethylolpropane-tolylene diisocyanate adduct, produced by Nippon Polyurethane Industry Co., Ltd.) was further added thereto as a crosslinking agent. The solution was cast on a glass plate and dried at 80° C. for 5 minutes to obtain a 100 μm thick soft film on the glass substrate. The ion conductivity of the film was $6 \times 10^{-4}$ S/cm at 25° C. Even at low temperature as −20° C. the film was flexible and had an ion conductivity of $1.8 \times 10^{-4}$ S/m.

EXAMPLE 3

To the acrylic polymer solution obtained in Example 2 was added 100 parts of a propylene carbonate solution containing 10 parts of lithium perchlorate in place of 10 parts of lithium perchlorate as used in Example 2. Two parts of Colonate L were added to the polymer solution as a crosslinking agent, and the solution was cast on a glass plate and dried at 80° C. for 5 minutes to obtain a soft film. The ion conductivity of the film was $1.5 \times 10^{-3}$ S/cm at 25° C. Even at low temperature as −20° C. the film was flexible and had an ion conductivity of $7 \times 10^{-4}$ S/m.

EXAMPLE 4

In the same reaction vessel as used in Example 1, 80 parts of an acrylic monomer having a hexamethylene chain of chain length 6 in its side chain and a methoxyethyl ether moiety at the end of the side chain, 19.5 parts of hexyl acrylate, and 0.5 part of 6-hydroxyhexyl acrylate (serving to provide reactive sites to an isocyanate compound added as a crosslinking agent as hereinafter described) were dissolved in 150 parts of ethyl acetate, and 0.5 part of azobisisobutyronitrile was added as a polymerization initiator. The solution was polymerized at 60° C. for 4 hours and then at 80° C. for 2 hours to obtain an acrylic polymer solution of polymer conversion of 99%.

To the polymer solution was added 10 parts of lithium perchlorate, and 2 parts of Colonate L (trimethylolpropanetolylene diisocyanate adduct, produced by Nippon Polyurethane Industry Co., Ltd.) was further added thereto as a crosslinking agent. The solution was cast on a glass plate and dried to obtain a 100 μm thick soft film on the glass substrate. The ion conductivity of the film was $3 \times 10^{-4}$ S/cm at 25° C. Even at low temperature as −20° C. the film was flexible and had an ion conductivity of $1.1 \times 10^{-4}$ S/m.

EXAMPLE 5

To the acrylic polymer solution obtained in Example 4 was added 100 parts of a γ-butyrolactone solution containing 10 parts of lithium perchlorate in place of 10 parts of lithium perchlorate as used in Example 4. Two parts of Colonate L were added to the polymer solution as a crosslinking agent, and the solution was cast on a glass plate and dried at 80° C. for 5 minutes to obtain a soft film. The ion conductivity of the film was $9 \times 10^{-4}$ S/cm at 25° C. Even at low temperature as −20° C. the film was flexible and had an ion conductivity of $4 \times 10^{-4}$ S/m.

EXAMPLE 6

6-Hydroxyhexyl acrylate was brominated and reacted with a sodium salt of ethanethiol to obtain an acrylic monomer having a hexamethylene of chain length 6 as a side chain and an ethyl thioether moiety at the end of the side chain. In 150 parts of ethyl acetate was dissolved 100 parts of the resulting acrylic monomer, and 0.5 part of azobisisobutyronitrile was added to the solution as a polymerization initiator. The solution was put in a reaction vessel equipped with a condenser, an inlet for nitrogen, a thermometer, and a stirrer and polymerized at 60° C. for 4 hours and then at 80° C. for 2 hours to obtain an acrylic polymer solution of polymer conversion of 99%.

To the polymer solution was added 10 parts of lithium perchlorate, and the solution was cast on a glass plate and dried at 80° C. for 5 minutes to obtain a soft film having a thickness of 100 μm. The ion conductivity of the film was $7 \times 10^{-4}$ S/cm at 25° C. Even at low temperature as −20° C. the film was flexible and had an ion conductivity of $2.5 \times 10^{-4}$ S/m.

While the invention has been described in detail and with reference to specific examples thereof, it will be apparent to one skilled in the art that various changes and modifications can be made therein without departing from the spirit and scope thereof.

While the invention has been described in detail and with reference to specific embodiments thereof, it will be apparent to one skilled in the art that various changes and modifications can be made therein without departing from the spirit and scope thereof.

What is claimed is:

1. A polyelectrolyte comprising a (meth)acrylic polymer and an ionic salt, the (meth)acrylic polymer comprising (A) 20 to 100 parts by weight of a (meth)acrylic monomer represented by the following formula (I):

$$CH_2=C(R_1)COO-R_2-R_3 \qquad (I)$$

wherein $R_1$ represents a hydrogen atom or a methyl group; $R_2$ represents an alkyl chain having 6 to 12 carbon atoms; and $R_3$ represents $(XR_4)_nXR_5$, wherein X represents —O— or —S—; $R_4$ represents an alkyl group having 1 to 4 carbon atoms; n represents 0 or an integer of 1 to 20; and $R_5$ represents a hydrogen atom, a methyl group or an ethyl group, (B) 0 to 80 parts by weight of a (meth)acrylic monomer represented by the following formula (II):

$$CH_2=C(R_1)COO-R_6 \qquad (II)$$

wherein $R_1$ represents a hydrogen atom or a methyl group; and $R_6$ represents an alkyl group having 2 to 12 carbon atoms, and (C) 0 to 30 parts by weight, per 100 parts by weight of the total amount of components (A) and (B), of a monomer copolymerizable with components (A) and (B).

2. A polyelectrolyte as claimed in claim 1, wherein said ionic salt is an ionic salt of lithium.

3. Sheets comprising a substrate having provided on one or both sides thereof a layer comprising a polyelectrolyte comprising a (meth)acrylic polymer and an ionic salt, the (meth)acrylic polymer comprising:

(A) 20 to 100 parts by weight of a (meth)acrylic monomer represented by the following formula (I):

$$CH_2=C(R_1)COO-R_2-R_3 \qquad (I)$$

wherein $R_1$ represents a hydrogen atom or a methyl group; $R_2$ represents an alkyl chain having 6 to 12 carbon atoms; and $R_3$ represents $(XR_4)_nXR_5$, wherein X represents —O— or —S—; $R_4$ represents an alkyl group having 1 to 4 carbon atoms; n represents 0 or an integer of 1 to 20; and $R_5$ represents a hydrogen atom, a methyl group or an ethyl group, (B) 0 to 80 parts by weight of a (meth)acrylic monomer represented by the following formula (II):

$$CH_2=C(R_1)COO-R_6 \qquad (II)$$

wherein $R_1$ represents a hydrogen atom or a methyl group; and $R_6$ represents an alkyl group having 2 to 12 carbon atoms, and (C) 0 to 30 parts by weight, per 100 parts by weight of the total amount of components (A) and (B), of a monomer copolymerizable with components (A) and (B).

4. Sheets as claimed in claim 3, wherein said ionic salt is an ionic salt of lithium.

5. A polyelectrolyte comprising:

(i) 100 parts by weight of a (meth)acrylic polymer comprising:

(A) 20 to 100 parts by weight of a (meth)acrylic monomer represented by the following formula (I):

$$CH_2=C(R_1)COO-R_2-R_3 \qquad (I)$$

wherein $R_1$ represents a hydrogen atom or a methyl group; $R_2$ represents an alkyl chain having 6 to 12 carbon atoms; and $R_3$ represents $(XR_4)_nXR_5$, wherein X represents —O— or —S—; $R_4$ represents an alkyl group having 1 to 4 carbon atoms; n represents 0 or an integer of 1 to 20; and $R_5$ represents a hydrogen atom, a methyl group or an ethyl group, (B) 0 to 80 parts by weight of a (meth)acrylic monomer represented by the following formula (II):

$$CH_2=C(R_1)COO-R_6 \qquad (II)$$

wherein $R_1$ represents a hydrogen atom or a methyl group; and $R_6$ represents an alkyl group having 2 to 12 carbon atoms, and (C) 0 to 30 parts by weight, per 100 parts by weight of the total amount of components (A) and (B), of a monomer copolymerizable with components (A) and (B), and (ii) 400 parts by weight or less of an ionic salt solution.

6. A polyelectrolyte as claimed in claim 5, wherein said ionic salt solution is a solution of an ionic salt of lithium in an organic solvent.

7. Sheets comprising a substrate having provided on one or both sides thereof a layer formed of a polyelectrolyte comprising:

(i) 100 parts by weight of a (meth)acrylic polymer comprising:

(A) 20 to 100 parts by weight of a (meth)acrylic monomer represented by the following formula (I):

$$CH_2=C(R_1)COO-R_2-R_3 \qquad (I)$$

wherein $R_1$ represents a hydrogen atom or a methyl group; $R_2$ represents an alkyl chain having 6 to 12 carbon atoms; and $R_3$ represents $(XR_4)_nXR_5$, wherein X represents —O— or —S—; $R_4$ represents an alkyl group having 1 to 4 carbon atoms; n represents 0 or an integer of 1 to 20; and $R_5$ represents a hydrogen atom, a methyl group or an ethyl group, (B) 0 to 80 parts by weight of a (meth)acrylic monomer represented by the following formula (II):

$$CH_2=C(R_1)COO-R_6 \qquad (II)$$

wherein $R_1$ represents a hydrogen atom or a methyl group; and $R_6$ represents an alkyl group having 2 to 12 carbon atoms, and (C) 0 to 30 parts by weight, per 100 parts by weight of the total amount of components (A) and (B), of a monomer copolymerizable with components (A) and (B), and (ii) 400 parts by weight or less of an ionic salt solution.

8. Sheets as claimed in claim 7, wherein said ionic salt solution is a solution of an ionic salt of lithium in an organic solvent.

* * * * *